UNITED STATES PATENT OFFICE.

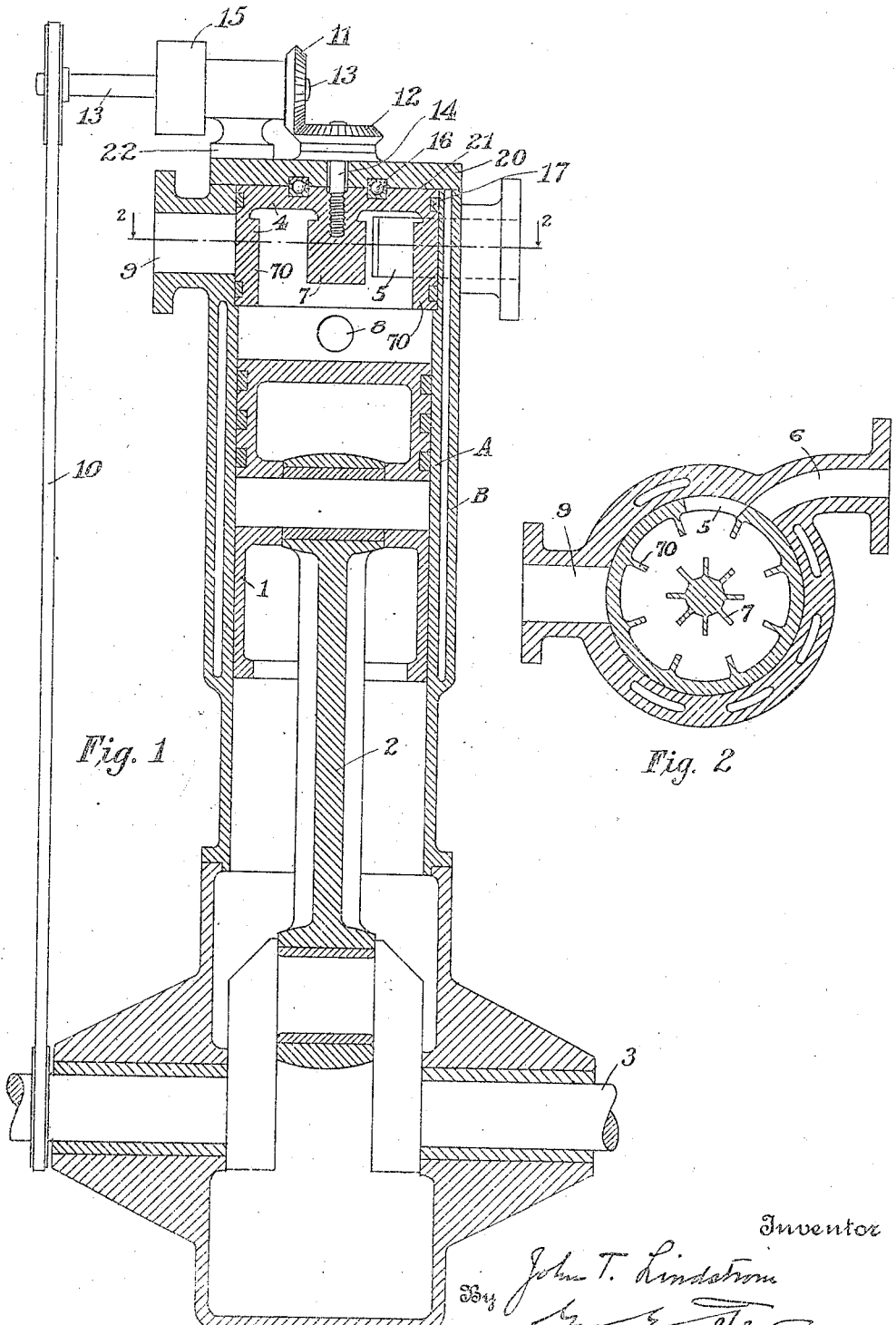

JOHN T. LINDSTROM, OF ALLENTOWN, PENNSYLVANIA.

VALVE FOR INTERNAL-COMBUSTION ENGINES.

1,282,602.

Specification of Letters Patent.   Patented Oct. 22, 1918.

Application filed May 13, 1918.   Serial No. 234,193.

*To all whom it may concern:*

Be it known that I, JOHN T. LINDSTROM, citizen of the United States, residing at Allentown, in the county of Lehigh and State of Pennsylvania, have invented certain new and useful Improvements in Valves for Internal-Combustion Engines, of which the following is a specification.

This invention relates to valves particularly adapted for internal combustion engines, and comprises a rotary valve which is located in the head of the cylinder, and possesses certain advantages of construction and operation as will more fully appear from the following description.

The object of the invention is to provide such a valve in the form of a cup, having practically the same diameter as the piston, and with a single port which acts to permit both the inlet and exhaust at the proper time. The valve is exposed to the same temperature as the piston and cylinder, and therefore, has the same expansion and contraction, which serves to prevent leakage incident to unequal expansion.

The valve is provided with wings or fins which project into the compression chamber and which act to stir or mix incoming gas with any burnt gas left in the cylinder, so as to assist in making the combustible mixture. The wings are set in staggered relation to each other so as to have a good mixing effect when the valve is rotated.

In the accompanying drawings:—

Figure 1 is a longitudinal section of an engine provided with a valve; and

Fig. 2 is a section on the line 2—2 of Fig. 1.

Referring specifically to the drawing, "A" indicates the engine cylinder provided with the usual water jacket "B" which extends around, or incloses the valve chamber in the head of the cylinder, as best shown in Fig. 2. The piston is indicated at 1, the connecting rod at 2, and the crank of the main shaft at 3. 8 is a hole for a spark plug.

As stated, the barrel of the cylinder is continued or extended beyond the explosion chamber to form a valve casing in the cylinder head, which casing incloses the circular rotary valve 4. This valve has the form or shape of a cup with the opening presented toward the cylinder space. The circular wall of the valve is provided with a port 5, and the valve is rotated to register the port with the inlet passage 6, and the exhaust passage 9 at proper times, these passages entering opposite sides of the valve casing. A ring of ball bearings 16 is interposed between the back wall 21 of the valve and the head 20 on the end of the valve casing or cylinder, and this wall serves to connect the cylindrical port of the valve so that unequal expansion thereof, or of different parts thereof is prevented, and the valve is at all times held in a truly cylindrical form.

A stem or shaft 14 is tapped into the head end of the wall 21 of the valve, passing at a close fit through the cylinder head 20. This stem is provided with a beveled gear 12 which meshes with a gear 11 on a shaft 13 which is made in sections connected by an adjustable coupling 15 which permits the valve to be set or adjusted at the proper angle of rotation. The shaft 13 is carried by a bracket 22 on the cylinder head, and this shaft may be rotated by any suitable gearing of the two-to-one type in four cycle engines. A convenient way to operate it is by a chain indicated at 10.

The exterior of the hub of the valve is provided with a set of vertical radial spaced wings 7, and the interior surface of the peripheral wall of the valve is provided with a series of vertical radial spaced wings 70 which are arranged on alternate radial lines with respect to the wings 7, thereby forming a tortuous or zig-zag passage.

When in operation, the valve is rotated, these wings stir up the mixture as it enters the cylinder, and mixes the gas thoroughly before it is compressed, this action being assisted by the tangential flow of the mixture incident to the corresponding location of the inlet passage itself.

In operation, the drawing, Fig. 2, shows the valve about to open the inlet port 6, at which time the suction stroke of the piston commences and continues until the inlet is closed. Compression takes place during the continued rotation of the valve, together with the explosion, and the valve remains closed until the exhaust stroke of the piston at which time the port 5 begins to register with the exhaust passage 9 through which the burnt gases then escape.

The cavity of the valve forms part of the compression space, which with the heat of expansion assists in holding the valve in gas tight contact with the wall of its casing leakage being further prevented by the packing rings 17, one of which is located near the lower end of the valve below the inlet and exhaust passages, and the other of which is located near the upper end of the valve above said passages. Leakage around the valve is thereby effectively prevented. Lubrication of the valve is readily accomplished by oil passing the piston and flowing along the interior of the cylinder to the valve casing; or it may be otherwise provided for. The thrust on the valve incident to the pressure within the cylinder is taken by the roller bearings 16. It may be noted that the wall of the valve casing being integral with the cylinder, and exposed to the cooling water in the jacket, has the same expansion as the cylinder. Also the valve can be readily removed and replaced, without disconnecting the inlet or exhaust conduits, by simply removing the cap 20, the valve and its gearing coming away therewith.

I claim:

1. The combination with a gas-engine cylinder, of a rotary cup-shaped valve in the head of the cylinder, the cavity of the valve forming part of the compression space, the inner wall of the valve having projecting wings to stir the fuel mixture as it passes through the valve.

2. The combination with a gas-engine cylinder, of a hollow rotary valve in the head end of the cylinder, said valve having a central hub and an outer wall each provided with wings extending into the hollow part of the valve to stir the fuel mixture therein.

3. The combination with a gas-engine cylinder, of a hollow rotary valve in the head end of the cylinder, said valve having a central hub and an outer wall each provided with wings extending into the hollow part of the valve to stir the fuel mixture therein, said wings being located in alternate staggered relation.

In testimony whereof, I affix my signature in presence of two witnesses.

JOHN T. LINDSTROM.

Witnesses:
 CHAS. L. WALTERS,
 ERWIN M. FREED.